Jan. 22, 1952           H. K. WEISS           2,583,033
APPARATUS FOR DETERMINING COURSE OF AN AERIAL TARGET
Filed Feb. 4, 1946           2 SHEETS—SHEET 1
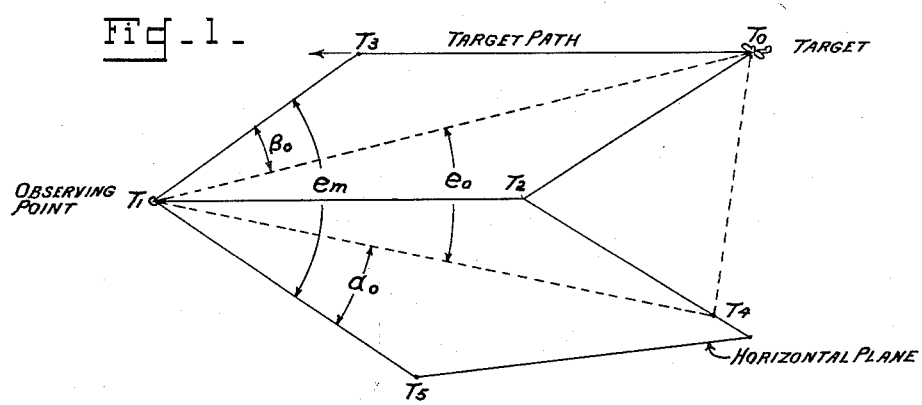
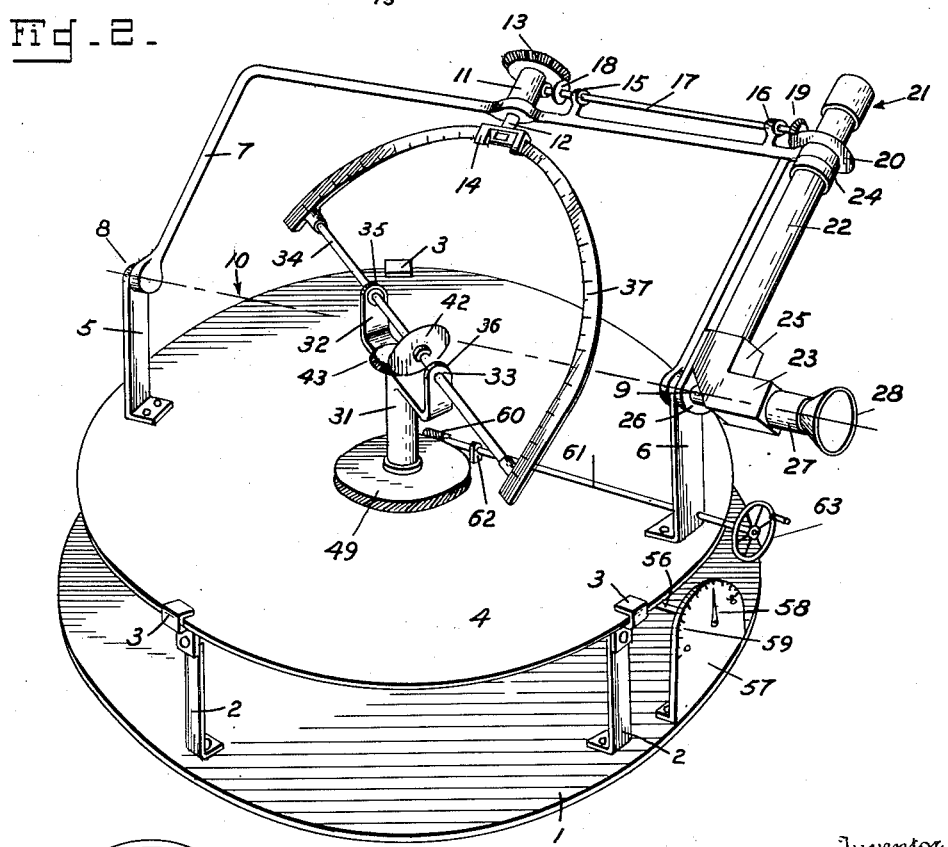
Inventor
Herbert K. Weiss Jan. 22, 1952      H. K. WEISS      2,583,033
APPARATUS FOR DETERMINING COURSE OF AN AERIAL TARGET
Filed Feb. 4, 1946      2 SHEETS—SHEET 2
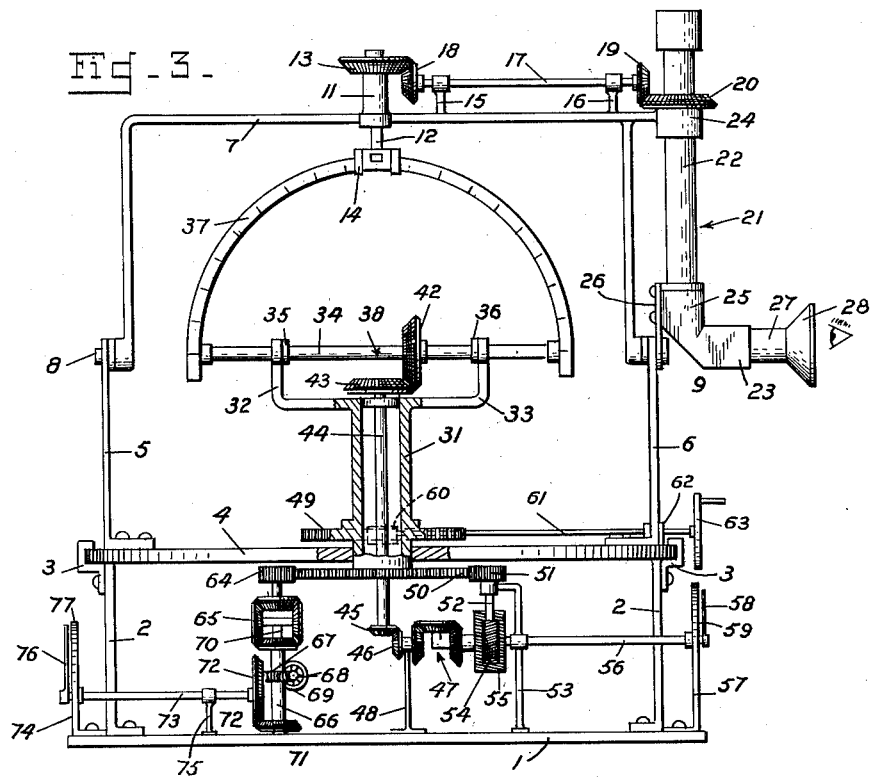
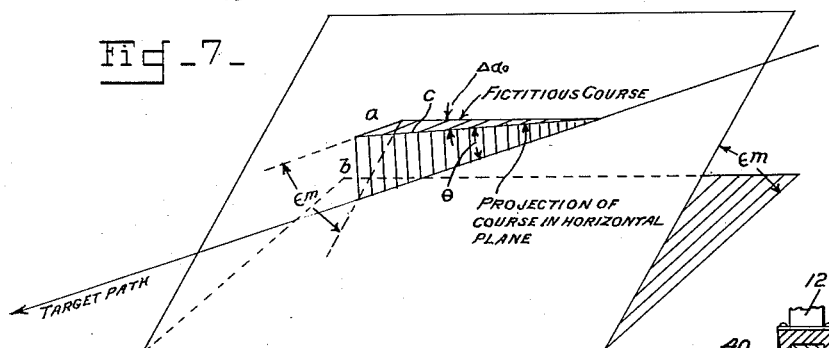
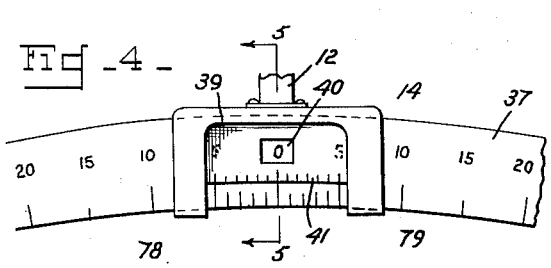
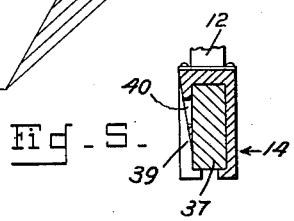
Inventor
Herbert K. Weiss Patented Jan. 22, 1952

2,583,033

UNITED STATES PATENT OFFICE 2,583,033

APPARATUS FOR DETERMINING COURSE OF AN AERIAL TARGET

Herbert K. Weiss, El Paso, Tex.

Application February 4, 1946, Serial No. 645,419

2 Claims. (Cl. 33—69)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a geometrical instrument for use in connection with certain types of antiaircraft fire control computers.

In all gun fire computers, certain input values are combined to derive a number of output values, two of which are the azimuth and elevation angles at which the gun should be trained in order to hit a specific moving target at any given instant of time. The computers of the type mentioned, require among other input values (1) the angle of approach of the target and (2) the dihedral angle which the slant plane determined by the path of the target and the observing instrument, makes with the horizontal plane.

It is an object of the invention to provide an instrument wherein the aforesaid values may be quickly determined with a high degree of accuracy.

Another object is to provide an instrument wherein the values (1) and (2) mentioned above may be determined by the use of a single direct sighting instrument.

A further object is to provide a precision instrument wherein the values mentioned may be determined and, if desired, introduced directly into a computer or director.

A still further object is the provision of a means whereby the determination of the aforesaid values may be determined in a simple and accurate manner.

Another object is the provision of an instrument whereby a plane is determined and rotated about a line of sight to a target while maintaining a line normal to the first line and lying in said plane, parallel to the apparent course of the target, then measuring the elevation of said plane about a horizontal axis lying therein, and the azimuth of said axis, as functions of the course of the target.

Other objects and advantages of the invention will become apparent as the description proceeds.

In the drawing:

Figure 1 is a perspective view of a geometrical figure illustrating the values which the instrument determines and the principles upon which it operates.

Figure 2 is a perspective view of the instrument showing the parts in the relative positions they might assume in actual use.

Figure 3 is a vertical elevational view partly in section and with the line of sight device and the parts controlled thereby at 90° elevation.

Figure 4 is a detail view upon an enlarged scale of a section of the bail and its slidable yoke and illustrating more particularly the manner in which the yoke and bail cooperate to indicate one of the angular values determined by the instrument.

Figure 5 is a section taken upon the line 5—5 of Figure 4 and showing the slidable connection between bail and yoke.

Figure 6 is a detail view showing the appearance of a target and telescope reticle to an observer looking through the telescope.

Figure 7 is a perspective view of a figure showing the geometrical relation between the path of a climbing or diving target and the so-called fictitious or corresponding horizontal path determined by the instrument.

Referring to Figure 1, a target aircraft is assumed to be at the point $T_0$, proceeding along a horizontal course $T_0T_3$. The gun, director and observing instrument of the present invention are located at observing point $T_1$. The slant plane including the target path and point $T_1$ intersects the horizontal plane in the line $T_1T_2$. A vertical plane is passed through the target at $T_0$ and the observing point at $T_1$ and intersects the aforesaid slant plane in the line $T_0T_1$ and the horizontal plane in the line $T_1T_4$. The lines $T_1T_3$ and $T_1T_5$ are both perpendicular to the aforesaid line $T_1T_2$ and hence determine a plane normal to $T_1T_2$. Then, with reference to the observing point $T_1$:

$e_0 = T_0T_1T_4 =$ the present angular height of the target, $e_m = T_3T_1T_5 =$ the dihedral angle between the horizontal reference plane $T_1T_2T_5$ and the slant plane $T_0T_1T_2$, $\beta_0 = T_0T_1T_3 =$ the angle of approach of the target in the slant plane = the complement of the angle between the line of sight to the target and the target path, $a_0 = T_4T_1T_5 =$ the angle of approach of the target in the horizontal plane = the projection of $\beta_0$ upon the horizontal plane.

It is desired to continuously measure the angles $e_m$, $a_0$ and $\beta_0$.

Referring to Figures 2 and 3, the numeral 1 indicates a base supported in fixed level position at point $T_1$, Figure 1. A number of standards 2 are secured to and project upwardly from base 1 and carry brackets 3 which rotatably support a circular platform 4. A pair of standards 5 and 6 are secured to and rise from platform 4. These standards have bearings at their upper ends defining an axis 10 directly above and parallel to, a diameter of platform 4. A frame 7, of generally U shape carries aligned trunnions 8 and 9 at its ends by which the frame is journaled in standards 5 and 6 for pivotal movement about axis 10. At a point midway of its horizontal portion, frame 7 has a sleeve 11 fixed thereto. This sleeve has an axial bore defining an axis that is perpendicular to and concurrent with the axis 10 defined by trunnions 8 and 9. A stub shaft 12 is journaled within sleeve 11 and has a bevel pinion 13 secured to its outer end and a channeled yoke or guide member 14 fixed to its inner end. The construction of member 14 will be subsequently described.

Frame 7 carries a pair of aligned bearings 15 and 16 within which a shaft 17 is journaled. This shaft has a bevel pinion 18 fixed thereto at one end, in mesh with pinion 13. Shaft 17 has another bevel pinion 19 fixed to its other end and in mesh with a bevel pinion 20 fixedly secured to the objective sleeve or portion 22 of a telescope indicated generally by the numeral 21. Portion 22 is mounted for rotation about its optical axis, parallel to shaft 12, by means of collar 24 forming a portion of frame 7, and a prism casing 25. The casing has a bracket 26 secured thereto and journaled upon trunnion 9 so that telescope 21 pivots as a unit with frame 7 about axis 10. The gear and shaft connections between sleeve 22 and shaft 12 are such that they rotate through equal angles in the same direction. Casing 25 contains a prism, not shown, that deflects the line of sight at 90° into an ocular 27 carrying a rubber guard 28. As shown at Figure 6, rotatable sleeve 22, has a reticle 29 on which is formed a diametrical arrow 30. This figure shows a typical view through ocular 23 during use of the instrument, wherein the sleeve 22 has been rotated in a manner subsequently described, until arrow 30 is parallel to the apparent path of travel of a target T. Subsequently, the telescope 21 and frame 7 will be raised slightly until, when the telescope is properly adjusted the center of arrow 30 will overlie the image of the target. It will be understood that the operator continuously actuates the sight to maintain the aforesaid relation during firing and that the parts are so arranged that arrow 30 is at all times parallel to a line connecting any two corresponding spaced points of member 14, such as 78 and 79, Figure 4.

A sleeve 31 is rotatably mounted upon platform 4 with its central axis normal to the plane of said platform. This sleeve carries arms 32 and 33 adjacent its upper end. The sleeves carry aligned bearings 35 and 36 at their ends defining an axis that, in the position of the parts shown upon Figure 3, is coincident with axis 10. Thus, although relative angular movement may take place between these two axes they always intersect at a common central point 38 (Figure 3), upon the vertical axis of sleeve 31. A shaft 34 is journaled within bearings 35 and 36 and has a semi-circular bail 37 fixed to its ends. This bail is concentric of the aforesaid point 38 and is graduated from a central zero point, both ways to 90°. As clearly shown at Figures 2 to 5 inc., guide member 14 is channeled to receive bail 37 so that the two may have smooth relative sliding movement while compelled to rotate together about the axis of shaft 12. The central portion of member 14 is beveled on one or both sides, as indicated for example, at 39 and has an opening 40 beneath which the graduation numerals on bail 37 pass as the member 14 moves therealong. If desired, a vernier scale 41 may be provided along the lower edge of beveled portion 39 to afford increased accuracy of reading.

Shaft 34 has a bevel pinion 42 secured thereto, in mesh with a pinion 43 attached to the upper end of a vertical shaft 44 which is journaled by suitable antifriction bearings within and centrally of sleeve 31. This shaft extends downwardly beneath platform 4 where it has a bevel pinion 45 attached thereto, in mesh with a pinion 46 connected to drive one side of a differential indicated generally by the numeral 47. A bearing bracket 48 supported on base 1, journals pinion 46 and the adjacent side of the differential.

A gear 50 is secured to the lower end of sleeve 31, below platform 4 and is in mesh with a pinion 51 on a shaft 52, journaled in a bearing carried by a bracket 53. The lower end of this shaft has a worm 54 in mesh with a worm wheel 55 connected with a sleeve to which is also attached a second side of differential 47. A shaft 56 is journaled in bearings carried by bracket 53 and a second bracket 57 attached to base 1. This shaft has the center of differential 47 mounted upon its inner end and a pointer 58 secured to its outer end. Pointer 58 moves over a scale 59 graduated from 0° at its ends to a common 90° graduation at its center (see Figure 2). The gear ratios are such that, when sleeve 31 is rotated, by means subsequently described, while shaft 34 is held against rotation in bearings 35 and 36, the two sides of differential 47 are driven equally and in opposite directions so that the center of the differential remains motionless. Thus said shaft 56 is rotated only by and in proportion to rotations of bail 37 with shaft 34, and pointer 58 indicates on scale 59 to give the true angle of inclination of bail 37 about the axis of shaft 34.

A worm gear 49 is fixed to sleeve 31 adjacent the lower end thereof and slightly above platform 4. As seen at Figure 2, a worm 60 meshes with gear 49 and is fixed to a shaft 61 which is rotatably supported by bearings in a bracket 62 and standard 6. A handwheel 63 is secured to the outer end of shaft 61 so that, when this handwheel is turned, sleeve 31 is rotated and carries shaft 34 with it. The connections are such that, to the operator looking into eyepiece 28, the arrow 30 appears to rotate in the same direction as the rotation of handwheel 63. When the parts are in the position shown upon Figure 3, the full rotation of sleeve 31 is transmitted through bail 37 to shaft 12 and thence to telescope sleeve 22. At the other extreme, when bail 37 is horizontal, rotation of sleeve 31 merely causes the bail to slide through member 14. Thus it will be noted that the rotation imparted to shaft 12 by rotation of sleeve 31 is equal to the angle of rotation of 31 multiplied by the sine of the angle of elevation of bail 7 above the horizontal.

Gear 50 at the lower end of sleeve 31 also meshes with a pinion 64 connected to drive one side of a differential indicated generally by the numeral 65. The other side of differential 65 is connected to a sleeve 66 having a worm gear 67 thereon. A shaft, not shown, has a worm 68 thereon together with a handwheel 69. The center or planetary of the differential is fixed to a shaft 70 extending within a sleeve 66 and having a bevel pinion 71 secured to its lower end. This pinion is in mesh with a gear 72 fixed to a shaft 73 journaled in bearings carried by supports 74 and 75. A pointer 76 is affixed to the end of shaft 73 and cooperates with a scale 77 throughout a full circle from 0° to 360°. The gear ratios between sleeve 31 and shaft 73 are such that the two rotate synchronously. Since shaft 34 rotates in azimuth with sleeve 31, pointer 76 indicates the angle of rotation of said shaft and, by initially setting the pointer by actuation of handwheel 69 and the corresponding side of differential 65, the pointer will indicate the azimuth of shaft 34 relatively to any predetermined base line. For example, if shaft 34 is rotated until its axis lies in the north-south direction, handwheel 69 is then released and turned until pointer 76 indicates 0° and again locked by any suitable mechanism, not shown. Thereafter, pointer 76 will indicate the true azimuth of shaft 34. It will be understood that any reference line other than the N-S direction may be selected.

In using the device, the pointer 76 is first adjusted in the manner just described, to indicate the azimuth of shaft 34 relatively to the desired base line. When a target is identified and selected for engagement, the operator looks into eyepiece 28, and grasps sleeve 22 with one hand and wheel 63 with the other. He first directs the line of sight onto the target by a combined rotation of platform 4 about its vertical axis and of frame 7 and telescope sleeve 22 about the axis of trunnions 8 and 9. Then, while thus operating the parts as aforesaid, to maintain the line of sight upon the target, he rotates handwheel 63 until the arrow 30 is in alignment with the apparent path of the target. Adjustment will be made so that the center of the arrow (which may be indicated by a dot as shown) is in line with the center of the target.

Under the foregoing conditions of adjustment, arrow 30 lies in the same slant plane as the target path, that is plane $T_0$, $T_1$, $T_2$, of Figure 1 and so, in effect, do the corresponding points such as 78 and 79, Figure 4. Hence, two points on bail 37 lie in the aforesaid slant plane and since the mid point 38 of shaft 34 is at the center of rotation of the instrument, which is also in the said slant plane, the plane defined by bail 37 and shaft 34 coincides with said slant plane. This is evident since the two planes have three discrete points in common and not on the same straight line. Then the angle of bail 37 measured in a plane perpendicular to the axis of shaft 34 is the dihedral angle $e_m$ of the slant plane. Since pointer 58 is responsive only to rotations of bail 37 about the axis of shaft 34, it indicates the angle $e_m$. As platform 4 is rotatable in azimuth any target can be sighted by moving frame 7 in one direction only from the vertical. Thus scale 59 need be graduated in one direction only. While scale 59 has been shown as a semi-circular one, corresponding to 90° of rotation of bail 37, it may have any angular extent desired for a 90° rotation of bail 37. For example, by the use of proper step-up gearing, pointer 58 may be caused to rotate through a full 360° rotation for 90° of rotation of bail 37. Under the conditions of adjustment mentioned, shaft 34 lies along the line formed by the intersection of the slant plane and horizontal or ground plane through the instrument, that is, the line $T_1, T_2$, so long as the path of the target is horizontal. As this condition is continuously maintained, pointer 76 indicates upon scale 77, the angle between the course or path of the target and the preselected base line. Movement of yoke 14 from zero or central position on bail 37 is equal to the angle of approach in the slant plane, that is, the angle $\beta_0$, Figure 1, and may be ascertained by reading the indicator carried by the yoke, relatively to the scale on bail 37.

From Figure 1 it is clear that the relations between the angles are:

$$\sin e_0 = \cos \beta_0 \sin e_m \qquad (1)$$

and, $$\cos \alpha_0 = \frac{\cos \beta_0 \cos e_m}{\cos e_0} \qquad (2)$$

Hence, all the angular values identified on Figure 1 and defined in the first part of the specification, are determinable by the instrument and may be automatically set into a director or computer, or transferred thereto by scale readings and manual adjustments of the director.

Broadly speaking then, the instrument utilizes bail 37 to establish a plane that is rotatable about a normally vertical axis and an intersecting horizontal axis lying in said plane. The yoke 14 serves to establish a line in said plane, spaced from the aforesaid horizontal axis, as for example the line determined by the points 78 and 79, Figure 4. This line is maintained parallel to the apparent path of a target, as viewed from the instrument, by a combined rotation of the bail and plane determined thereby about its two axes. The dihedral angle of the intersection of said plane and the horizontal plane is then indicated, as well as the angular relation of the horizontal axis to any selected horizontal reference line. These angular values are then utilized in known manner, as by introduction into a gun fire director or computer. Other useful values may be determined, such as the angular relation of the aforesaid horizontal axis and a line in said plane passing through the point of intersection of said axes and the target. It is important to note that the axis of shaft 12 is always normal to the aforesaid line determined by points such as 78 and 79 of yoke 14, and that it passes through point 38 at all times and, when the instrument is in operation, intersects the target.

Thus it will be seen that my invention will determine the course of an airplane in level flight and the angular height of the slant plane through the target course, by alignment of an arrow with the apparent direction of the craft's path. Moreover, since this measurement is accomplished by setting in target course and slant plane angular height, two quantities which remain constant as long as the craft maintains straight line flight, a setting once made will be maintained by the tracking operation and may be revised and adjusted from time to time for a higher degree of accuracy. As the heading may differ from the actual course under conditions of drift, the correct alignment of the arrow will not always be along the target axis. However, only a correct setting of arrow 30, that is, a setting parallel to the actual apparent path as distinguished from the actual apparent heading, will cause the pointer 58 to remain fixed in position. Thus, after initially aligning the arrow with the target axis, the effect of drift may be removed by making small adjustments until the value of $e_m$ as indicated by pointer 58, remains constant.

The foregoing explanation is based upon the supposition that the path of the target craft is level. In the case of a diving or climbing path, the instrument determines the dihedral angle between the ground plane and the plane containing the actual target path. Since shaft 34 is aligned with the intersection of these two planes, it is not parallel to the target path when the target is climbing or diving. Under such conditions, the values given by the instrument will be those corresponding to a so-called "fictitious course" and, for a number of uses in fire control, are as useful as the correct or actual values corresponding to the true course. The trigonometrical relations between the fictitious and true courses are illustrated in Figure 7 where the true target path is shown as inclined at the angle $\theta$ to its projection upon the horizontal plane. Calling the angle between the aforesaid projection and the fictitious course $\Delta\alpha_0$, and using the linear values identified in Figure 7, the relation between the actual and fictitious courses is as follows:

$$\sin \Delta\alpha_0 = a/c \qquad (3)$$
$$\tan e_m = b/a = c \tan \theta/a \qquad (4)$$
$$\tan \theta = b/c \qquad (5)$$
$$\sin \Delta\alpha_0 = \frac{\tan \theta}{\tan e_m} \qquad (6)$$

The word "line" as used in the claims means a straight line.

While I have disclosed the preferred form of the invention as now known to me, various alterations, modifications, substitutions and refinements are possible without changing the basic principles upon which the instrument operates. It is my desire to reserve all those changes that fall within the scope of the subjoined claims. Specifically, it might be desired to provide means indicating the angular values of movement of frame 7 about axis 10 and of sleeve 31 relatively to platform 4 and to provide connections automatically introducing one or more of the various angular values directly into a director or computer. Such changes will be obvious to those skilled in the art of geometrical and fire control instruments.

Having now fully disclosed the invention, what I claim and desire to secure by Letters Patent is:

1. In a sighting device for determining the characteristics of flight of an aircraft with respect to a fixed point, said characteristics including the dihedral angle between the horizontal plane and the slant plane determined by the path of the target and said point, as well as the angle of approach of the target in said slant plane, a base, a platform supported by said base for rotation about a first vertical axis, a first sleeve independently rotatable on said platform about said first axis, a semi-circular bail journaled on said sleeve for pivotal movement about a second and horizontal axis forming a diameter of said bail, a frame pivoted on said platform for pivotal movement about a third and horizontal axis, a second sleeve on said frame, a shaft journaled in said second sleeve for rotation on a fourth axis normal to said third axis, all said axes being concurrent at a point at the center of said bail, a yoke fixed to said shaft and engaging said ball for sliding along the periphery thereof and effective to rotate said shaft and bail as a unit about said fourth axis and to maintain said fourth axis in the plane of said bail, a sight fixed to said frame and effective to determine a line of sight to a target parallel to said shaft and fourth axis, said sight having a part rotatable about the optical axis thereof and bearing an arrow transversely of said axis in the field of view of the sight, means connecting said part and shaft to effect synchronous rotation thereof in the same direction, manually operable means carried by said platform to rotate said first sleeve and bail about said first axis, said line being maintained upon a remote target by combined movements of said platform and frame while maintaining said arrow parallel with the apparent path of the target by actuation of said manually operable means, indicating means responsive to rotation of said bail about said second axis, and second indicating means responsive to rotation of said first sleeve.

2. In a sighting device for determining the characteristics of flight of an aircraft, said characteristics including the dihedral angle between the horizontal plane and the slant plane determined by the path of the target and said point, as well as the angle of approach of the target in said slant plane, a base, a platform and a sleeve independently rotatable on said base about a common vertical axis, a semi-circular bail having a horizontal diametral shaft journaled in said sleeve, a second shaft within and concentric of said sleeve and extending below said platform, gears connecting said shafts for rotation in unison, a frame mounted on said platform for pivotal movement about a horizontal axis concurrent at a point with the said horizontal diameter of said bail and the axis of said second shaft, a third shaft journaled in said frame with its axis normal to the horizontal axis of said frame and passing through said point, a yoke fixed to said third shaft and slidably receiving said bail for sliding only along the periphery thereof, a target sight carried by said frame and determining a line of sight parallel to said third shaft, said sight including a part rotatable about the line of sight thereof and having a reticle in the field of view and establishing a line and a direction therealong transversely of said line of sight and fixed to rotate as a unit with said part, means connecting said shaft and yoke for synchronous rotation in the same direction, a dial on said base, a pointer rotatable over said dial, a differential carried by said base, means connecting respective sides of said differential to be operated by said second shaft and sleeve, the center of said differential being connected to operate said pointer whereby said pointer indicates the true elevation of the slant plane through said target course when said sight is directed upon the target and said reticle is rotated parallel to the apparent course thereof.

HERBERT K. WEISS.

REFERENCES CITED

The following references are of record in the file of this patent:

UNITED STATES PATENTS

| Number | Name | Date |
|---|---|---|
| 453,159 | Paoli | May 26, 1891 |
| 2,167,422 | Langgasser | July 25, 1939 |
| 2,200,030 | Lauck | May 7, 1940 |

FOREIGN PATENTS

| Number | Country | Date |
|---|---|---|
| 320,787 | Italy | Sept. 6, 1934 |
| 333,806 | Italy | Jan. 14, 1936 |
| 421,315 | Great Britain | Dec. 18, 1934 |
| 745,432 | France | Feb. 14, 1933 |